United States Patent [19]

Stjern et al.

[11] Patent Number: 4,653,919

[45] Date of Patent: Mar. 31, 1987

[54] LASER GYRO WITH DITHERED MIRRORS AND CURRENT DITHER

[75] Inventors: Daryl C. Stjern, Thousand Oaks; Frank Daly, Simi Valley, both of Calif.

[73] Assignee: Sundstrand Optical Technologies, Inc., Newbury, Calif.

[21] Appl. No.: 462,548

[22] Filed: Jan. 31, 1983

Related U.S. Application Data

[63] Continuation-in-part of Ser. No. 346,750, Feb. 8, 1982, abandoned.

[51] Int. Cl.[4] .............................................. G01C 19/64
[52] U.S. Cl. ..................................................... 356/350
[58] Field of Search ......................................... 356/350

[56] References Cited

U.S. PATENT DOCUMENTS

| 3,467,472 | 9/1969 | Killpatrick | 356/350 |
| 3,612,690 | 10/1971 | Staats | 356/350 |
| 3,752,586 | 8/1973 | Hutchings et al. | 356/350 |
| 4,152,071 | 5/1979 | Podgorski | 356/350 |
| 4,281,930 | 8/1981 | Hutchings | 356/350 |
| 4,410,274 | 10/1983 | Ljung | 356/350 |

Primary Examiner—Vincent P. McGraw
Attorney, Agent, or Firm—Wood, Dalton, Phillips, Mason & Rowe

[57] ABSTRACT

A laser gyro for detecting rates of rotating the gyro having a primary dither means for eliminating lock-in at low rates of rotation and a secondary dither means for eliminating nonlinearities in the gyro output when the input rate is a harmonic of the primary dither frequency. The gyro includes a body having a polygonal shaped cavity therein with a mirror disposed at each of the corners thereof to form a closed loop path for two counter-rotating beams. The primary dither includes means for dithering two mirrors 180° out of phase to maintain the cavity path length constant. The secondary dither includes a current dither for differentially modulating the current in each leg of the gyro to randomly null nonlinearities in the gyro output.

8 Claims, 8 Drawing Figures

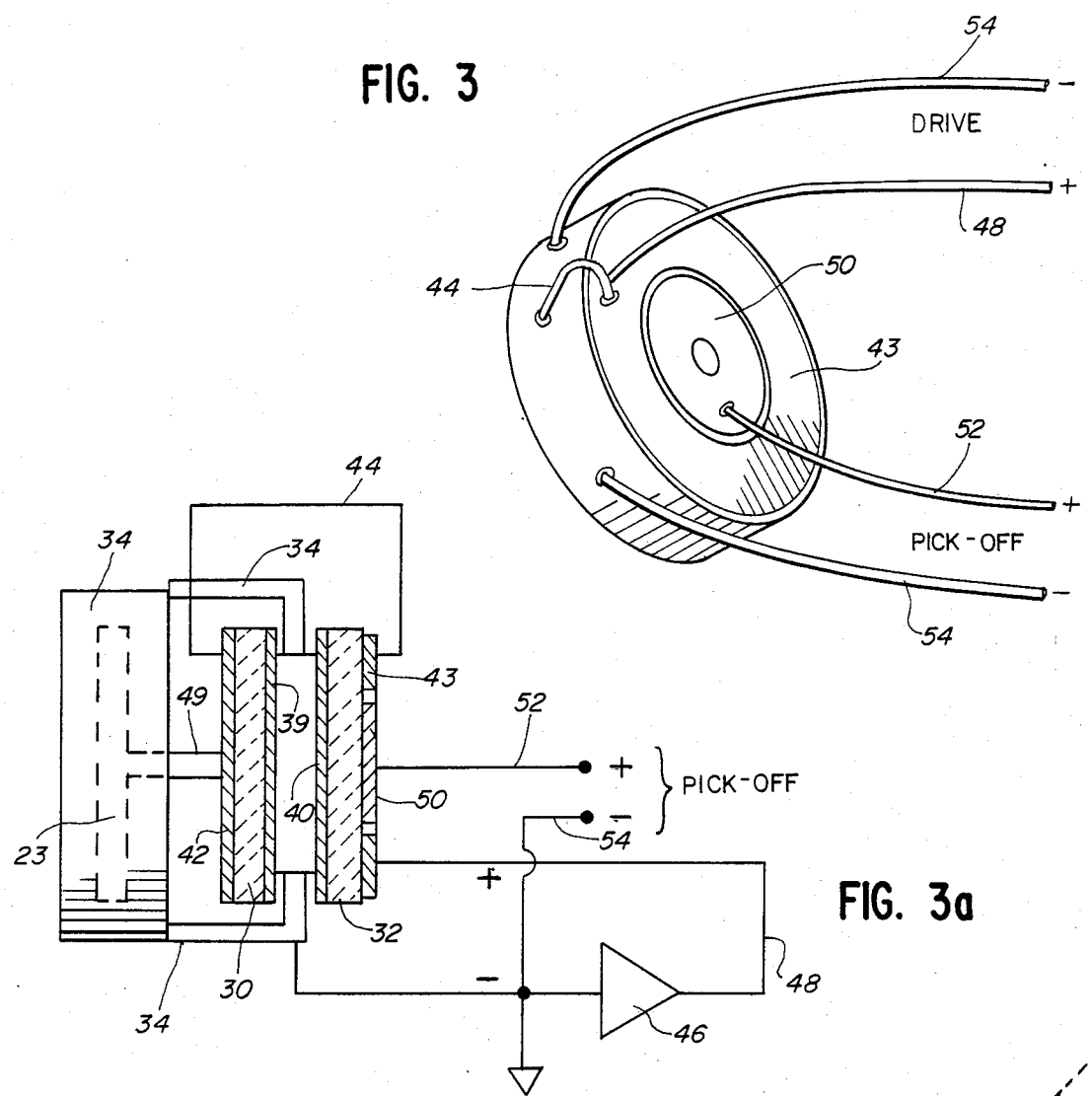
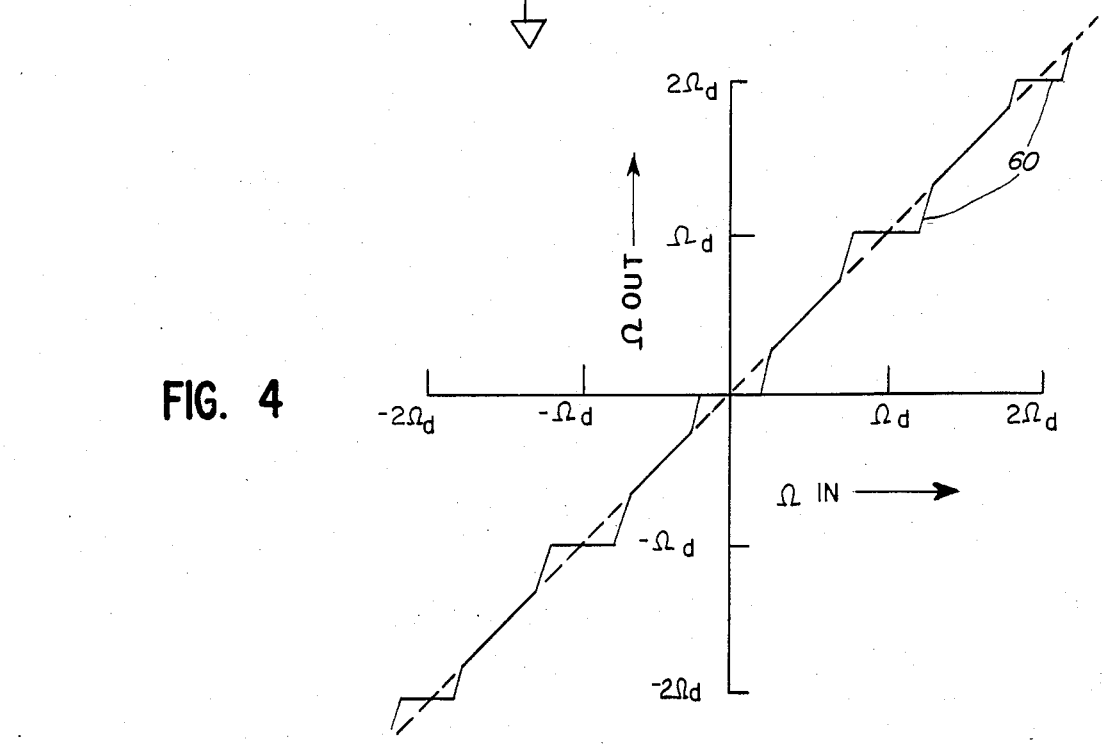

LASER GYRO WITH DITHERED MIRRORS AND CURRENT DITHER

This application is a continuation in part of application Ser. No. 346,750 filed Feb. 8, 1982, now abandoned.

BACKGROUND OF THE INVENTION

This invention relates generally to laser gyroscopes and more particularly concerns means for eliminating errors in the gyro output due to "lock-in".

In a laser angular rate gyro, two monochromatic beams of light are caused to travel in opposite directions about a looped path, which extends about the axis of rotation of the gyro. The path is formed by a cavity which is typically polygonal in shape having mirrors disposed at the corners thereof to reflect the beams along the path. As the gyro is rotated, the effective path length for one beam is increased and the effective path length for the other beam is decreased, due to Doppler shifting. A beat frequency is produced in response to heterodyning of the two beams as with a combining prism, the beat frequency signal in turn producing a fringe pattern which is typically detected by a photodiode. The latter produces a sine wave output whose frequency is linearly proportional to the rate of rotation. The beat frequency is given by the expression:

$$\Delta f = \frac{4A}{\lambda \rho} \Omega$$

where:
$\Omega$ represents the rate of rotation;
A is the geometric area of the laser gyro;
$\lambda$ is the wavelength of the laser; and
$\rho$ is the perimeter of the geometric figure described by the lasing path.

Accordingly, the magnitude and sign of the frequency difference, $\Delta f$, are indicative of the rate and direction of rotation of the gyro.

At very low rates of rotation, errors arise due to "lock-in" effects, whereby no frequency difference is observed. Lock-in arises because of imperfections in the lasing cavity, principally in the mirrors, which produce backscatter from one laser beam into the other laser beam. At low rates of rotation where the frequency splitting between the two beams is small, the coupling of the backscatter from one beam into the other beam causes the two beams to oscillate at the same frequency. This results in a deadband, or lock-in region, the lock-in threshold rate being determined by the amount of backscatter. This deadband results in the gyro output not tracking the input. When the gyro input rate of rotation exceeds the threshold of the lock-in rate, the beams separate in frequency and begin to produce output pulses.

Various dither techniques have been employed to eliminate lock-in at low rates of rotation. One such technique is to dither the mirrors located along the cavity path of the gyro as shown in Hutchings U.S. Pat. No. 4,281,930. Hutchings requires that all of the mirrors be dithered at the same frequency but out of phase by an amount equal to 360° divided by the number of mirrors. The phase difference between the dither applied to each of the mirrors must be precisely controlled so as to maintain the cavity path length constant. Because all of the gyro mirrors must be dithered as taught by Hutchings, problems in maintaining the cavity path length constant have arisen since the greater the number of mirrors, the more difficult it is to maintain precise control of the phase difference therebetween.

Another known technique for eliminating lock-in at low rates of rotation is to provide a current dither such as shown in Staats U.S. Pat. No. 3,612,690. The current dither of Staats includes a noise source, the output of which is amplified and limited to provide a rectangular wave randomly variable in frequency and pulse width but constant in amplitude. This rectangular wave and a phase shifted version thereof are applied to a push-pull amplifier, the outputs of which are connected to the anodes of the laser gyro so that the current from each anode is frequency modulated. If the current dither of Staats is employed such that one anode is cut off while the other anode is operating, problems may arise in that there is not enough gain to lase. Even if the two anodes are simultaneously operational, the dither imparted to the current is insufficient to eliminate lock-in at certain rates of rotation.

Although various dither techniques, such as mirror dithers or current dithers, taken alone may prevent lock-in at low rates of rotation near zero, it has been found that nonlinearities occur in the output of the laser gyro when the input rate is a harmonic of the dither frequency, impairing the accuracy of the gyro.

SUMMARY OF THE INVENTION

In accordance with the present invention the disadvantages of prior laser angular rate gyros as discussed above have been overcome. The laser gyro of the present invention employs a primary dither technique for eliminating lock-in at low rates of rotation and a secondary dither technique to eliminate nonlinearities in the gyro output when the input rate is a harmonic of the primary dither frequency.

The laser gyro includes a quartz body having a rectangular laser cavity therein with a mirror disposed at each of the corners thereof to form a closed loop path for the two counter-rotating laser beams. The primary dither technique includes dithering two adjacent mirrors 180° out of phase to maintain the cavity path length constant, the remaining two mirrors being fixed.

This technique eliminates lock-in at low rates of rotation by operating on the backscatter, the result being a Doppler shift in the frequency of the backscatter waves, which are biased away from the primary waves, so that coupling effects are minimized, and frequency locking is not present.

The secondary dither technique includes a current dither for modulating the current in each leg of the gyro differentially so as to eliminate nonlinearities in the gyro output when the input rate is a harmonic of the mirror dither frequency. The current dither is random in both frequency and amplitude to enhance the integration of the nonlinearities to zero.

These and other objects and advantages of the invention, as well as the details of an illustrative embodiment, will be more fully understood from the following description and drawings, in which:

FIG. 3 is a perspective view of a piezoelectrically driven mirror, with drive and pick-off connections;

FIG. 3a is a cross section of the mirror drive shown in FIG. 3;

FIG. 4 is a graph illustrating the problem of lock-in, and its solution in accordance with the present invention;

DETAILED DESCRIPTION

Figure 1:
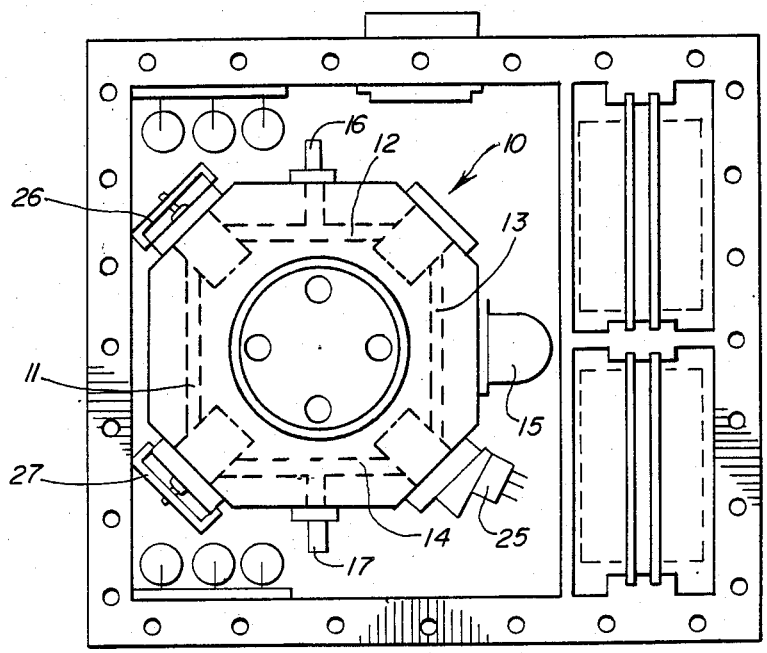
FIG. 1 is an elevation, in section, showing details of a laser gyro in accordance with the invention.
Figure 2:
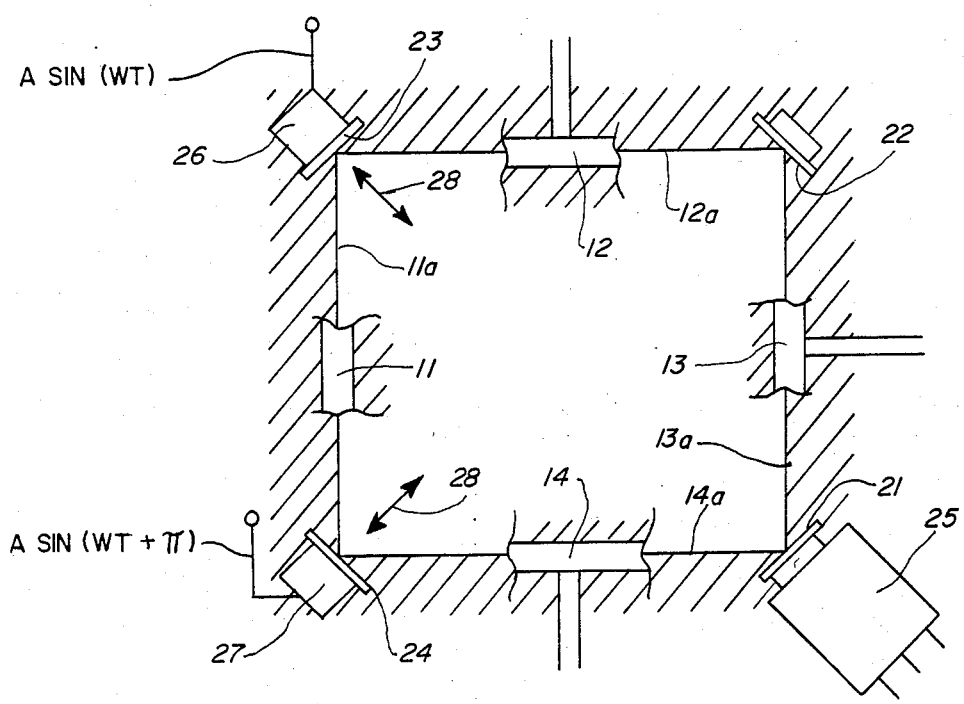
FIG. 2 is a schematic diagram of components of the FIG. 1 gyro.

The laser gyro, as shown in FIGS. 1 and 2, includes a body 10, which may be made of quartz having four beam channels 11-14 disposed therein forming a cavity. Although the cavity as shown is rectangular, it may be triangular or have various other polygonal configurations which form a ring. The channels contain a gas or gases suitable for laser operation such as 90% helium and 10% neon, at a pressure of 3 torr. Suitable means may be provided for establishing a gas discharge between a cathode 15 and anodes 16 and 17, each of which is in communication with the channels 11-14. The cathode 15 and anodes 16 and 17, produce two counter-rotating laser beams traveling along the cavity path, defined by legs 11a, 12a, 13a and 14a.

A mirror 21-24 is located at each of the four corners of the cavity, for reflecting the beam around the ring. The beat frequency output of the gyro is sensed by a detector 25 associated with one of the mirrors 21 as is well known in the art. Two adjacent mirrors such as 23 and 24 are vibrated periodically, in directions, as indicated by the arrows 28, perpendicular to their faces to provide a primary dither. Each of the mirrors 23 and 24 is vibrated by a respective driver 26 and 27 attached thereto, mirrors 21 and 22 being fixedly mounted to the gyro body 10. The drive applied to the mirror 24 is 180° out of phase relative to the drive applied to the mirror 23. Thus, the displacement of mirror 23 may be represented by the expression A sin ($\omega t$), and the displacement of mirror 24 by the expression A sin ($\omega t + \pi$).

Each of the drivers 26 and 27 for mirrors 23 and 24 is a modified bimorph. FIGS. 3 and 3a show the basic two wafer design for the driver 26. Two piezoelectric discs 30 and 32 are carried by legs 34 of a frame 36, which also carries the mirror 23. The two discs have back to back grounded electrodes 39 and 40 which are electrically connected to grounded legs 34. An electrode 42 on the disc 30 and an outer annular electrode 43 on the disc 32 are electrically interconnected at 44, and driven by a driver amplifier 46 via lead 48. The mirror 23 is coupled at 49 to the disc 30 to be oscillated thereby. A central electrode 50 on the disc 32 is used to detect the voltage developed as disc 32 oscillates, the voltage being "picked-off" at 52 and 54 for use as will appear. This design eliminates the thermal expansion instabilities found in a conventional bimorph with an attached pickoff.

The mirrors 23 and 24 are dithered 180° out of phase with respect to each other such that the overall cavity path length does not change. The ring laser therefore is maintained at mode center (i.e., at a frequency position at the center of the gain curve) with the mirror dither resulting in only a minimum path length perturbation. Because only two of the mirrors are dithered as opposed to all of the mirrors, the phase relationship between the two dithered mirrors and thus the cavity path length are more easily controlled.

Each mirror displaces approximately 1½ wavelengths to eliminate lock-in at low rates of rotation. As the mirror translates in and out, the laser beams travel back and forth across the mirror faces. This results in scatter center displacement with respect to the translated standing wave field modes, hence satisfying the phase shift requirements of phase modulation. In addition, the displacement between the scatter groups of the mirrors changes with time. It is the vector summation of these scatter groups which gives rise to a magnitude of lock-in. The oscillation of the mirrors causes the net scatter vector to be time modulated so as to further reduce lock-in.

The mirror dither technique has several advantages over other presently used biasing techniques such as dithering the entire body of the gyro. Although the mirror dither technique is not purely optical since the mirrors are driven by piezoelectric transducer elements, the displacement of the mirrors is extremely small compared to the displacement imparted to a body dithered laser gyro, the mirror displacement being typically on the order of 20μ inches peak to peak. Further, because of the high dither frequency of the mirrors which may be on the order of 9 KHz, coupling of the mirror motion to motions caused by the environment, such as shock and vibration, is minimized.

Mirror dithering is accomplished without the addition of elements to the basic optical cavity so as to be insensitive to thermal and magnetic effects which plague Faraday, magnetic mirrors, and (to a certain extent) multi-oscillator biasing approaches. Because there are no additional loss elements in the cavity, a gyro having dithered mirrors can be reduced to an extremely small size without a substantial loss in performance. Also, since the mirror drivers are external to the sealed laser cavity, the approach readily accommodates varying gyro frame designs for specialized packaging, environmental, or lifetime requirements. The simple nature of the basic design provides a low-cost, high-reliability instrument.

Although the two dithered mirrors eliminate lock-in at low rates of rotation, it has been found that nonlinearities in the gyro output occur when the input rate is a harmonic of the dither frequency as discussed below.

With the existence of backscatter in a laser gyro cavity the equation for the beat frequency, $\Psi$, is of the form:

$$\dot{\Psi}/2\pi = B_o + B_L \sin(\Psi + E) \tag{1}$$

where $B_o$ is proportional to the input rotation rate, $B_L$ is the lock-in frequency, and E is the phase of the resultant locked standing wave. Mirror dither theory modifies Equation (1) by making E a time dependent variable, E(t). As the mirror is longitudinally oscillated in the cavity, the individual point scatterers on the mirror move across the beam. Because the applied mirror dither oscillation is sinusoidal, the phase contribution from each mirror, $E_m$, becomes:

$$E_m = B_m \sin(\omega_o t), \tag{2}$$

where $\omega_o = 2\pi f_D$ and $f_D$ is the dither frequency, $B_m$ representing the mirror dither amplitude.

In Equation (2) it is assumed that the backscatter contribution from each mirror is the sum of a large number of scatters whose effect can be statistically averaged. With only two of the mirrors 23 and 24 being dithered 180° out of phase, the total backscatter is equal to the sum of the backscatter contributions from each of the dithered mirrors so that Equation (1) may be written as $$\dot{\Psi}/2\pi = B_o + B_{L1} \sin(\Psi + B_{m1} \sin(\omega_o t)) + B_{L2} \sin(\Psi + B_{m2} \sin(\omega_o t + \pi)) \quad (3)$$

where $B_{mi}$ is the dither amplitude of the ith mirror and $B_{Li}$ is the lock-in rate contribution from the backscatter of ith mirror.

The solution to Equation (3) is given by:

$$\Psi = 2\pi B_o t + M\sin(2\pi f_D t) + 2\pi B_L (J_0(M) \frac{\cos(2\pi B_o t)}{2\pi B_o t} + J_1(M)\left[\frac{\cos 2\pi(B_o + f_D)t}{2\pi(B_o + f_D)} - \frac{\cos 2\pi(B_o - f_D)t}{2\pi(B_o - f_D)}\right] + \cdots \quad (4)$$

where M is referred to as the modulation index and $J_n$ is the nth order Bessel function.

From equation 4 it is seen that the contributions to the coupling or lock-in terms becomes very large when the input rate is a harmonic of the mirror dither frequency, $f_D$, i.e., when:

$$B_o = 0, \pm f_D, \pm 2f_D, \ldots \quad (5)$$

As seen from FIG. 4, nonlinearities, indicated at 60, in the gyro output are centered around the harmonics of the dither frequency.

The coupling term $B_o$, when equal to zero, gives rise to the deadband or lock-in region at low rates of rotation. Thus if M is selected such that the zeroth order Bessel function $J_0$ equals zero, there is no lock-in at near zero rotation rates. The values of M which result in $J_0$ being equal to zero i.e. the roots of the Bessel function, are as follows:

$$M = 2.405, 5.52, 8.654 \quad (6)$$

The value, M=2.405, provides the optimum value of the mirror dither amplitude $B_m$ for $J_0 = 0$. Thus for the mirror dither to be optimized, it is important to maintain precise control of mirror dither amplitude and frequency, the mirror dither amplitude, $B_m$, being given by:

$$B_m = \frac{M\lambda}{4\pi} \sin \Phi \quad (7)$$

where $\Phi$ is the angle of incidence between the beam and the mirror, M is the modulation index, and $\lambda$ is the wave length of the laser.

When the modulation index, M, is a root of the Bessel function, the nonlinearity or lock-in near zero rates of rotation is eliminated. However, the nonlinearities or lock-bands at higher harmonics of the dither frequency still exist. The width of these lock-bands is given by:

$$|2B_L J_n(M)| \quad (8)$$

The laser gyro employs a plasma current dither as a secondary dither technique which modulates the gyro through the lock-band regions occurring when the input is a harmonic of the dither frequency so as to provide a continuous output.

In a helium-neon discharge plasma, there is a net gas movement caused by the Langmuir flow effect. In a layer approximately one ion mean free-path thick near the bore wall, there is a net gas flow from the cathode to the anode. This flow is due to a differential momentum transfer to the bore walls by the electrons and ions. The flow rate is proportional to the discharge current. The resulting backpressure buildup at the anode induces a Pioselle backflow of gas from the anode to the cathode along the bore center. This net bulk gas movement along the bore center Doppler shifts each of the counterrotating beams' gain curve differentially in the gas molecules' reference frame. This results in different mode pulling and pushing effects on each beam. In a gyro having a dual leg discharge where there is equal plasma current in each leg, these effects cancel. As a sinusoidally or preferably a randomly varying plasma current is applied 180° out-of-phase in each leg, the resulting frequency splitting of the beams, or beat frequency, $\dot{\Psi}_{cd}$, contribution from the current dither is given by:

$$\dot{\Psi}_{cd} = P[A - IB]2i_o \sin(\omega_i t); \quad (9)$$

where P is determined by various physical parameters of the gyro (e.g. bore diameter, gas pressure and composition, plasma voltage gradient); A and B are the mode pulling and pushing coefficients respectively, I is the laser intensity, $\omega_i = 2\pi f_i$ and $f_i$ is the current dither frequency and $i_o$ is the amplitude of the current dither. $\dot{\Psi}_{cd}/2\pi$ adds to the beat frequency contribution due to the dithered mirrors in equation (3) as follows:

$$\dot{\Psi}/2\pi = B_o + B_{L1} \sin(\Psi + B_{mi} \sin(\omega_o t)) + B_{L2} \sin(\Psi + B_{m2} \sin(\omega_o t + \pi)) + \dot{\Psi}_{cd}/2\pi \quad (10)$$

It is this frequency splitting of the beams caused by the current dither which randomly nulls the lock bands occurring when the input rate is a harmonic of the mirror dither frequency. Further, because the plasma current applied in each leg of the gyro is 180° phase shifted, maximum bias effects are obtained due to the Langmuir flow which average out the residual lock bands or nonlinearities.

Figure 5:
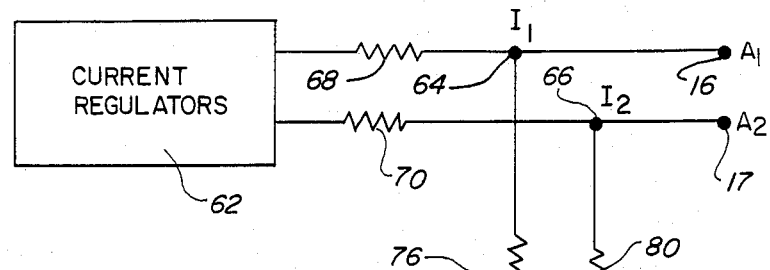
FIG. 5 is a schematic diagram of the current dither circuit.

The circuit providing the current dither, as shown in FIG. 5, includes a current regulator 62, the constant current outputs of which are connected to summing junctions 64 and 66 through respective precision resistors 68 and 70, the summing junctions 64 and 66 being connected to the anodes 16 and 17 respectively. The output of a random noise generator 72 is amplified by a noninverting amplifier 74, connected through a resistor 76 to the summing junction 64 associated with the anode 16. The output of the random noise generator 72 is also applied to an inverting amplifier 78, connected through a resistor 80 to the summing junction 66 associated with the anode 17 so that the random current applied to the summing junction 66 and anode 17 is 180° out of phase with the random current applied to the summing junction 64 and anode 16.

The random noise signal applied to the anode 16 and the 180° phase shifted noise signal applied to the anode 17 introduce a Langmuir flow effect which nulls the residual lockband occurring when the input rate is a harmonic of the mirror dither frequency. Because the current dither applied to the gyro is both random in amplitude as well as frequency, the integration of the nonlinearities to zero is enhanced.

Figure 6:
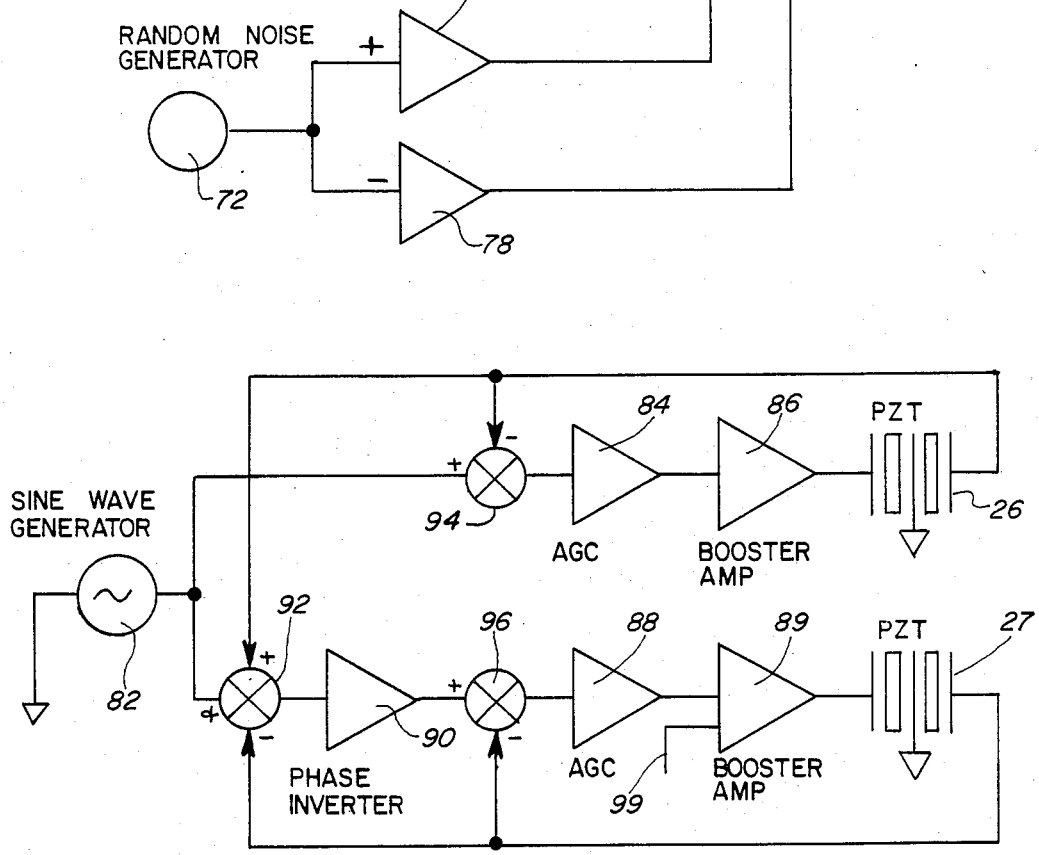
FIG. 6 is a schematic diagram of the mirror dither control.
Figure 6A:
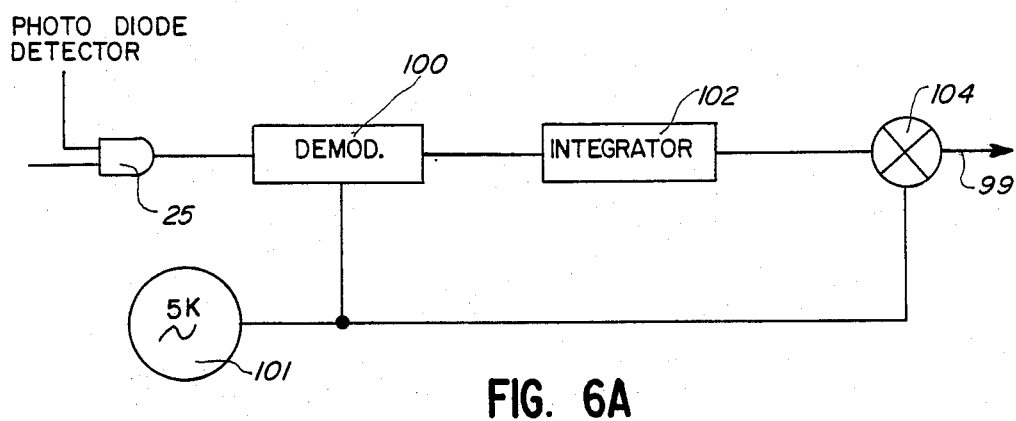
FIG. 6A is a schematic diagram of the control to maintain the laser cavity at mode center.

Precise control of the dithered mirrors 23 and 24 is achieved with a closed-loop feedback circuit as shown in FIG. 6 to maintain the phase relationship between the mirrors and to control the dither amplitude and the control circuit of FIG. 6A to maintain the laser gyro at mode center. Because the effectiveness of the mirror dither biasing technique is dependent on the modulation index, M, control of the dither amplitude is important. Even though precise control of the mirrors is assumed, substantial variations in the dither amplitude may arise from:

(1) Changes in the piezoelectric material characteristics from temperature variation.
(2) Hysteresis and depoling effects in the piezoelectric material.
(3) Mechanical compliance changes in the transducer mirror assembly.

The circuit of FIG. 6 controls the voltage applied to the piezoelectric transducer drivers 26 and 27 for the mirrors 23 and 24 to dither the mirrors precisely 180° out of phase. A sine wave generator 82 drives the piezoelectric transducer driver 26 through an automatic gain control 84 and a booster amplifier 86 connected in series therewith. The sine wave generator 82 is also connected to the piezoelectric transducer driver 27 through an automatic gain control 88 connected in series with a booster amplifier 89, the sine wave generator being connected to the gain control 88 through an inverting amplifier 90 so that the piezoelectric transducer driver 27 is driven 180° out of phase with the piezoelectric transducer driver 26. The automatic gain controls 84 and 88 and booster amplifiers 86 and 89 control the amplitude of the voltage applied to the piezoelectric transducer drivers 26 and 27 to provide the desired amplitude of the mirror dither, $B_m$.

The output of the piezoelectric transducer driver 26 is fed back to a noninverting input of a summing junction 92, whereas the output of the piezoelectric transducer driver 27 is fed back to an inverting input of the summing junction 92. The respective feedback paths to the summing junction 92 compensate for changes in the phase difference between the piezoelectric transducer drivers 26 and 27 to maintain the 180° phase shift, the changes in phase being caused by characteristics of the piezoelectric transducers; for example, temperature variations. The output of the piezoelectric transducer driver 26 is also applied to an inverting input of a summing junction 94, the output of the piezoelectric transducer driver 27 being applied to an inverting input of a summing junction 96. Each of the summing junctions 94 and 96 control the amplitude of the drive signal to the piezoelectric transducers to maintain it constant.

A control circuit which maintains the laser gyro operating at mode center is shown in FIG. 6A, having an output on line 99 connected to a second input of the booster amplifier 89. The path length control circuit is responsive to the output of the photodiode detector 25 which detects the intensity of the laser gyro output. The output of the photodiode is applied to a demodulator 100 to which a 5 Khz reference from a generator 101 is also applied to determine whether there has been a phase shift from mode center. If no phase shift is detected, the laser gyro is operating at peak gain, i.e., mode center. However, if a phase shift is detected by the demodulator 100, the error signal output from the demodulator is integrated by an integrator 102. The output of the integrator 102 is applied to a summing junction 104, the other input of which is the 5 Khz reference signal. The output of the summing junction 104 is applied to one of the piezoelectric transducer drivers such as through the booster amplifier 89 in order to null the phase shift and maintain the laser gyro at mode center. It is noted that the frequency of the reference signal from the generator 101 should not be a subharmonic of the mirror dither frequency.

We claim:

1. In a laser gyro for detecting rates of rotation, the gyro having a body with a polygonal shaped cavity therein forming a closed loop path through which two counter-rotating beams travel and having a mirror disposed at each of the corners of the cavity for reflecting the beams about the path, means for elminating errors in the output of the gyro caused by lock-in of the beams, comprising:
   means for generating a sine wave drive signal;
   first means responsive to the drive signal for vibrating one of said mirrors in a direction perpendicular to the surface of said mirror;
   second means responsive to the drive signal for vibrating another of said mirrors in a direction perpendicular to the surface of said mirror and 180° out of phase with said one mirror;
   means for deriving a feedback signal from one of said vibrating means; and
   means responsive to said feedback signal for modifying the sine wave drive signal to at least one of said mirror vibrating means.

2. The laser gyro of claim 1 further including:
   means for deriving feedback signals from both of said vibrating means; and
   means responsive to both of said feedback signals to compensate for changes in the phase difference between the first and second vibrating mirrors.

3. The laser gyro of claim 1 including means responsive to said feedback signal to maintain the amplitude of the drive signal applied to said one vibrating means constant.

4. The laser gyro of claim 1 including:
   means for deriving feedback signals from both of said vibrating means; and
   means responsive to each of said feedback signals to maintain the amplitude of the drive signal applied to the respective vibrating means constant.

5. The laser gyro of claim 1 further including
   means responsive to the output of the laser gyro for detecting a phase shift in the gyro output; and
   means responsive to the detecting means and coupled to one of said vibrating means for nulling any detected phase shift to maintain the laser gyro operating at mode center.

6. In a laser gyro for detecting rates of rotation, the gyro having a cavity therein forming a closed loop path through which two counter-rotating beams travel, said cavity having first and second legs through each of which a current flows producing said counter-rotating beams, and means for establishing a fixed frequency dither of said gyro to supress lock-in of the beams, means for eliminating nonlinearity in the output of the gyro caused by an input rate which is a harmonic of said dither frequency, comprising
   means for differentially modulating the current in each leg, the current varying randomly in frequency and amplitude to null said nonlineariities.

7. The laser gyro of claim 6 in which current flows in said first leg from a first anode to a cathode and in said second leg from a second anode to said cathode, said modulating means including:
- means for generating a constant current output;
- means for generating a random noise signal;
- first means for summing said random noise signal and said constant current output, the output of said first means being coupled to said first anode for randomly varying the amplitude and frequency of the current in said first leg;
- means for inverting said random noise signal;
- second means for summing said inverted random noise signal and said constant current output, the output of said second means being coupled to said second anode for randomly varying the amplitude and frequency of the current in said second leg 180° out of phase with the current in said first leg.

8. In a laser gyro for detecting rates of rotation, the gyro having a body with a polygonal shaped cavity therein forming a closed loop path through which two counter-rotating beams travel and having a mirror disposed at each of the corners of the cavity for reflecting the beams about the path, said cavity having first and second legs through which plasma current flows, the current in said first leg flowing from a first anode to a cathode and the current in said second leg flowing from a second anode to said cathode, producing said counter-rotating beams, means for eliminating errors in the output of the gyro, comprising:
- a primary dither means for vibrating at least two of but not all of said mirrors at the same frequency and in a direction perpendicular to the surface of the mirror, each of the vibrated mirrors being vibrated at a phase difference with respect to the other of said vibrated mirrors equal to 360° divided by the number of mirrors being vibrated to suppress lock-in at low rates of rotation; and
- a secondary dither means for randomly differentially modulating the plasma current flowing in each of said legs to supress nonlinearities where the gyro input rate is a harmonic of the primary dither frequency, including
- means for generating a random frequency and amplitude signal, said random signal being coupled to said first anode for randomly varying the frequency and amplitude of the plasma current flowing in said first leg and
- means for inverting said random signal, said inverted random signal being coupled to said second anode for randomly varying the frequency and amplitude of the plasma current flowing in said second leg 180° out of phase with the current flowing in said first leg.

* * * * *